J. E. KING.
COFFEE PERCOLATOR.
APPLICATION FILED AUG. 28, 1911.
1,035,970.
Patented Aug. 20, 1912.
2 SHEETS—SHEET 1.
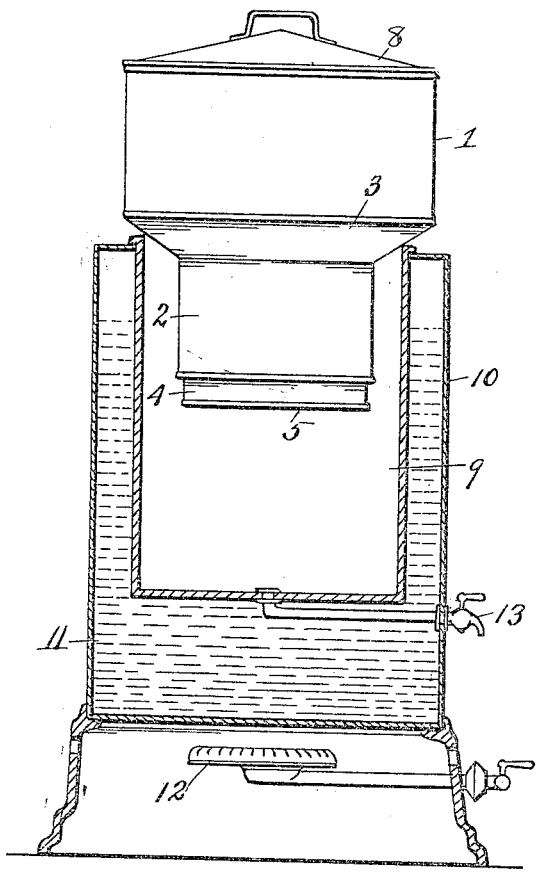
Fig. 1.
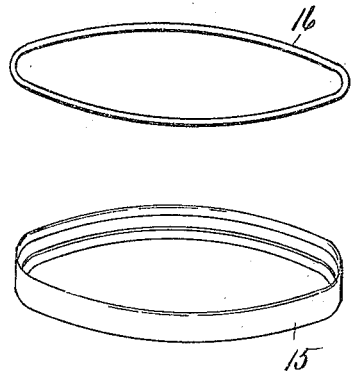
Fig. 3.
Fig. 4.
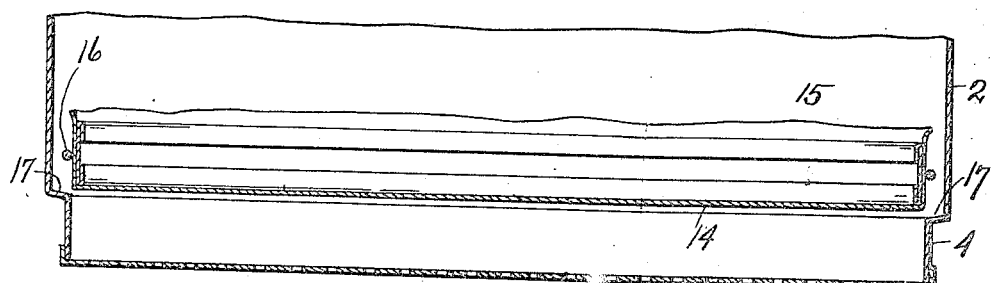
Fig. 2.
Witnesses
O. B. Baenziger
M. E. Broesamle
Inventor
John E. King
By E. S. Wheler Attorney

J. E. KING.
COFFEE PERCOLATOR.
APPLICATION FILED AUG. 28, 1911.

1,035,970.

Patented Aug. 20, 1912.
2 SHEETS—SHEET 2.

Witnesses
O. B. Reinziger.
M. E. Broesamle.

Inventor
John E. King
By E. S. Wheeler, Attorney.

UNITED STATES PATENT OFFICE.

JOHN E. KING, OF DETROIT, MICHIGAN.

COFFEE-PERCOLATOR.

1,035,970.  Specification of Letters Patent.  Patented Aug. 20, 1912.

Application filed August 28, 1911. Serial No. 646,402.

*To all whom it may concern:*

Be it known that I, JOHN E. KING, a citizen of the United States, residing at Detroit, in the county of Wayne, State of Michigan, have invented certain new and useful Improvements in Coffee-Percolators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to coffee percolators, especially designed for use in connection with coffee urns and consists in the construction and arrangement of parts hereinafter more fully set forth and pointed out particularly in the claim.

The object of the invention is to provide a percolator of comparatively simple and inexpensive construction, wherein the arrangement is such as to enable a perfect leaching of the coffee grounds in a manner to extract the oils therefrom, and prevent sediment and residue from entering the leached coffee.

The invention further contemplates an arrangement whereby the filter paper or filter agent employed may be quickly and perfectly placed in position, and the ring which holds said paper in place readily removed for cleaning.

A provision is also made for holding the strainer through which the boiling water is poured securely in place, thus preventing the coffee grounds passing above said strainer and lodging in the upper portion of the percolator.

The above object is attained by the structure illustrated in the accompanying drawings, in which:—

Figure 5:
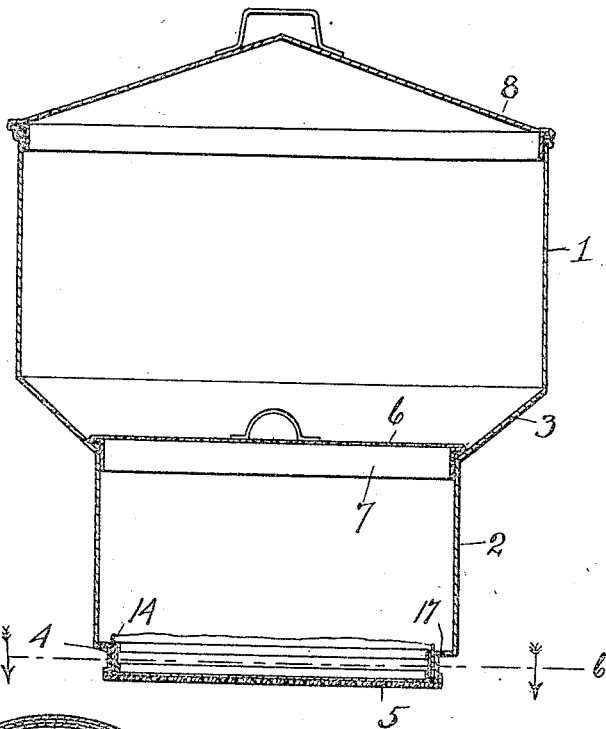
Figure 6:
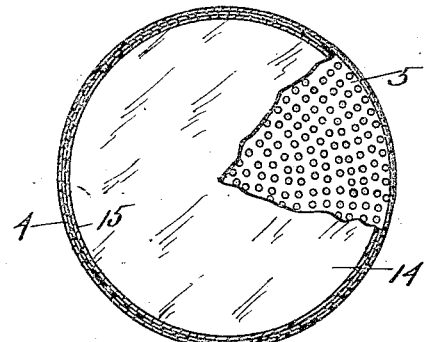
Figure 7:
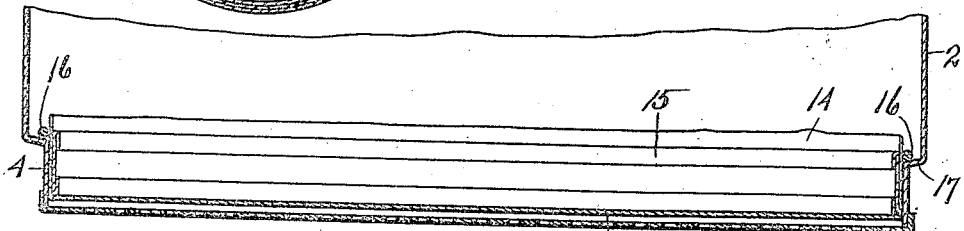

Figure 1 is a general view showing the coffee urn in vertical section and the percolator embodying my invention seated in said urn. Fig. 2 is an enlarged fragmentary view in section through the bottom of the percolator showing the ring which holds the filtering paper in place, with said paper mounted thereon in readiness for insertion into the bottom of the percolator. Fig. 3 is a perspective view of the circular binding wire which temporarily retains the filtering paper in position upon the holding or confining ring. Fig. 4 is a perspective view of said ring. Fig. 5 is a central vertical section through the percolator with all the parts in position. Fig. 6 is a horizontal section as on line 6—6 of Fig. 5. Fig. 7 is an enlarged fragmentary view in section through the bottom of the percolator showing the position of parts just prior to completing the operation of placing the ring which retains the filter paper in position in the bottom of the percolator.

Referring to the characters of reference, 1 designates the body of the percolator which is preferably cylindrical in shape and may be of any desired size. Depending from the bottom of the body of the percolator is a cylindrical container 2, the top of which is connected to the percolator body by an inclined circular wall 3, said container being of smaller diameter than the body of the percolator.

The bottom portion 4 of the container 2 is of reduced diameter and is provided with a perforated bottom plate 5. The top of the container portion 2 of the percolator is closed by a perforated cover 6 having a depending annular flange 7 that enters the upper end of said container to retain the cover in position, the marginal portion of said cover extending onto the lower edge of the inclined wall 3, as shown in Fig. 5 to prevent the passage of the cover into the container.

In the use of this device, the top 8 of the percolator is removed and the cover 6 of the container 2 is withdrawn to enable the coffee grounds to be placed in said container, when the perforated cover 6 is replaced in position and boiling water of the required quantity is poured into the percolator and the top 8 replaced. The boiling water passes through the perforated cover 6, and through the coffee in the container, leaching the oils therefrom, and finally passing through the perforated bottom 5 into the crock 9 in which the percolator is seated, as shown in Fig. 1. The crock 9 is mounted in the usual manner in a suitable urn 10 filled with water 11 which surrounds the crock and is heated by a burner 12 under the bottom of the urn to maintain the percolated coffee at the desired temperature. Communicating with the bottom of the crock 9 is a draft faucet 13.

In order that fine coffee grounds and sediment may be prevented from passing into the crock 9, the leached or percolated coffee is filtered through a sheet of Japanese paper 14, or analogous material. This paper is extremely delicate, and in order that it may not become torn, in placing it in position, and, to so retain it in place as to compel the passage of the coffee therethrough, there is employed a retainer ring 15, of an exterior diameter equal to the interior diameter of the reduced bottom portion 4 of the container 2, the height of said ring being equal to the depth of said reduced portion. A sheet of said filter paper is placed over said ring and is retained thereon as shown in Fig. 2 by a circular binding wire 16 which is of a diameter to fit over said ring.

When the circular binding wire 16 is forced over the ring with the paper thereon, said wire serves to hold the paper in position while the ring is being inserted into the reduced bottom portion 4 of the container. As said ring with the paper thereon is placed in position in the reduced bottom portion of the container the circular binding wire 16 embracing the exterior of the ring will engage the annular shoulder 17 formed between the reduced portion 4 and the body portion of the container, and become stripped from the ring 15 as said ring is forced into place, when said binding wire may be removed.

When the ring 15 is in place in the reduced portion of the container with the filter paper thereon, the marginal portion of said paper is confined between said ring and the wall of said reduced portion while the body of said paper, which stretches across said ring, will lie upon the perforated bottom 5, as clearly shown in Fig. 5. In this position of the parts, said paper is so supported that it cannot become torn and is so confined and retained by the ring 15 as to prevent the passage of the coffee from the percolator except through said paper and the perforated bottom 5 on which the paper rests.

After the operation of percolating shall have been completed, the percolator is lifted from the urn, the grounds emptied therefrom, and the ring 15 removed to enable another sheet of paper to be placed thereon for a succeeding operation.

When the ring 15 is removed, all parts of the percolator are accessible for cleaning. The inclined wall 3 which connects the body of the percolator with the cylindrical container serving to prevent the accumulation of coffee grounds or sediment thereon, enabling a perfect cleansing of the apparatus.

Having thus fully set forth my invention, what I claim as new and desire to secure by Letters Patent, is:—

A percolator comprising a container having a bottom portion of reduced transverse area, a perforated bottom plate closing the lower end of said reduced portion, a retainer ring adapted to fit snugly within the reduced bottom portion of the container, a sheet of filtering material carried by said ring and adapted to cover said perforated plate; a circular binder upon said ring to temporarily confine thereto the marginal portion of said sheet, said binder being adapted to slide from said ring as it is forced into the reduced bottom portion of the container and said ring being of such diameter as to confine the marginal portion of said sheet of filtering material between its periphery and the wall of the reduced bottom portion of the container.

In testimony whereof, I sign this specification in the presence of two witnesses.

JOHN E. KING.

Witnesses:
 E. S. WHEELER,
 J. OTTO BAENZIGER.